United States Patent Office 3,314,232
Patented Apr. 18, 1967

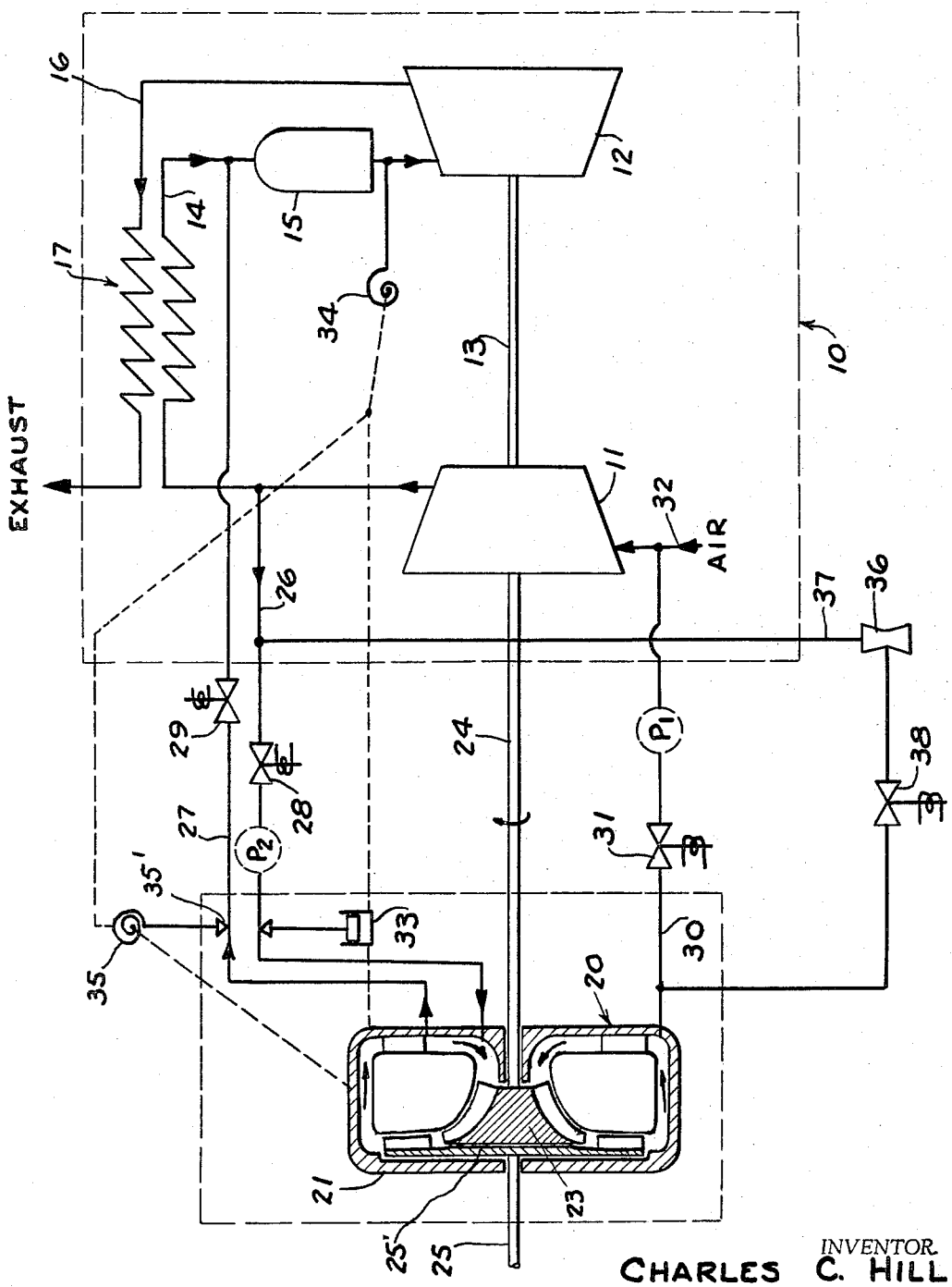

3,314,232
GAS TURBINE ENGINE WITH AERODYNAMIC
TORQUE CONVERTER DRIVE
Charles C. Hill, Ann Arbor, Mich.
(1490 Coolidge Road, Troy, Mich. 48084)
Filed June 23, 1965, Ser. No. 466,343
17 Claims. (Cl. 60—39.24)

This invention relates to gas turbines and particularly to the transmission of power from gas turbines to perform work.

In the use of gas turbines, speed reduction is required since the gas turbine shaft rotates at relatively high speeds. One conventional way of achieving speed reduction is to utilize a free power turbine with mechanical gears for reducing the speed. Obviously, such an arrangement necessitates heavy machinery which requires lubrication and is relatively costly to manufacture.

It has not heretofore been possible to achieve speed reduction in a single shaft gas turbine by use of a directly connected hydraulic torque converter because such an arrangement results in high losses and operating temperatures, cavitation problems and leakage and filling problems if operated at gas turbine speeds. Otherwise, the speed must be reduced ahead of the converter. Even so, the hydraulic torque converter is awkwardly matched to the gas turbine under changes in ambient air temperature and pressure conditions different from design conditions.

It is an object of this invention to provide a gas turbine wherein speed reduction can be achieved without the use of high-speed gears.

It is a further object of the invention to provide such a gas turbine wherein the performance of a free power turbine can be substantially achieved.

It is a further object of the invention to provide such a gas turbine which produces increasing torque with decreasing speed.

It is a further object of the invention to provide a gas turbine which can operate at constant turbine inlet temperatures under all operating loads.

It is a further object of the invention to provide a gas turbine-transmission system whose characteristics can be adjusted to deliver maximum available turbine power over a wide range of ambient conditions.

It is a further object of the invention to provide a gas turbine wherein the speed reduction is achieved without the use of oil or gears thereby eliminating the problems inherent in the use of these elements.

It is a further object of the invention to provide a gas turbine wherein transmission heat losses in the torque converter are removed and recovered without a heat exchanger.

It is a further object of the invention to provide a gas turbine which has superior starting and acceleration without the use of variable vanes in the gas turbine.

It is a further object of the invention to provide a gas turbine which incorporates engine braking without the use of variable vanes.

It is a further object of the invention to provide a gas turbine which does not have creep at idling speeds.

It is a further object of the invention to provide a gas turbine which has a higher stall torque ratio than can be obtained with free power turbines.

It is a further object of the invention to provide a gas turbine wherein temperature control can be achieved for partial load without the use of variable vanes.

It is a further object of the invention to provide a gas turbine which can be used as a source of pneumatic power at a higher pressure than is available in the turbine.

Basically, the invention comprises associating an aerodynamic torque converter with the gas turbine wherein the torque converter has a casing, stationary guide vanes and two rotors within said casing. One rotor is driven by the turbine shaft. The other rotor is the output element. A fluid line is provided between the casing and the inlet to the combustor of the gas turbine and a second fluid line is provided between the compressor discharge and the casing. The casing of the torque converter is thus controllably filled with a compressible fluid, namely, air, the temperature and pressure of which can be controlled as presently described to produce the desired torque-speed characteristics. Provision is made for injecting or extracting the fluid as desired to vary the temperature and pressure.

In the drawings:

The sole figure is a part sectional diagrammatic view of a gas turbine embodying the invention.

Referring to the drawing, the gas turbine embodying the invention comprises a conventional turbine 10 which includes a compressor 11 and a turbine 12 that preferably have the rotors thereof connected by a single shaft 13. A portion of the output of the compressor 11 in the form of compressed air flows through a fluid line 14 to the combustor 15 of the gas turbine 10. The exhaust gases from the turbine 12 flow through line 16 to the atmosphere. Preferably the lines 14, 16 are in heat exchange relationship as at 17.

In accordance with the invention, an aerodynamic torque converter 20 is provided and has a casing 21 with fixed guide vanes 22 and a rotor 23 that is connected by a shaft 24 to the shaft 13. The casing 21 is adapted to be filled with compressible fluid, namely, air, from the compressor so that upon rotation of the rotor 23, the flow of air exerts a torque which is provided to rotate an output rotor 25' and, in turn, the output shaft 25 of the aerodynamic torque converter, the flow of air being in the path of the arrows within casing 21. Output rotor 25' may be part of a single or multi stage turbine. Torque converter 20 is preferably of the outward radial flow turbine type. As shown in the drawing, torque converter 20 comprises a single stage of compression and expansion but the torque converter may have multiple stages of compression and/or expansion. Axial flow turbomachinery may also be used.

Compressible fluid in the form of compressed air may flow from the compressor 11 to the casing 21 through a first fluid line 26. In order to control the density of the fluid in the casing 21 and to provide for a steady through flow for cooling, a second fluid line 27 extends from the casing to the combustor line 14 at the inlet of the combustor 15. Specifically, the first fluid line 26 is connected to the casing 21 adjacent the outlet to the fixed vanes 22 and the second fluid line 27 is connected to the casing 21 adjacent the outlet of the stator vanes. Valves 28, 29 are provided in the fluid lines 26, 27 for control, as presently described. Second fluid line 27 can be connected to casing 21 at any point between the inlet and outlet of rotor 23 depending on the pressure differential required for circulation through line 27.

In order to assist in starting the turbine, a third fluid line 30 and an associated valve 31 are provided between the casing 21 of the aerodynamic torque converter 20 and the inlet 32 to compressor 11.

Further controls are provided and include a pressure valve 33 in line 26. Valve 33 is controlled by a temperature responsive element 34 at the inlet between the combustor 15 and the turbine 12. A temperature responsive element 35 is provided which is responsive to temperature of the compressible fluid in the casing 21 and controls a valve 35' in line 27. Pumps $P_1$, $P_2$ are provided in lines 30, 26, respectively. In addition, an ejector-type aspirator 36 is connected by a line 37 to the line 26 and a valve 38 controls the function of the aspirator 36 as presently described. As will be apparent, the pump $P_1$ and aspirator 36 can be operated independently and alternatively as may be desired.

The operation of the gas turbine may be more readily understood by reviewing the steps in positioning the various controls to start and accelerate the gas turbine. In idling operation of the gas turbine or in preparing the gas turbine for starting, the casing 21 is evacuated so that the working fluid density in the casing approaches zero. In addition, any bleed off from the compressor 11 through line 26 or 27 is interrupted by closing the valves 28 and 29. As the working fluid density approaches zero, there is no transmission of power if the turbine is operating. As a result, the output shaft 25 will not rotate or if at all, the creep will be very small. Thus, during idling or starting, the valves 28, 29 are closed and valve 31 is open. The valve 31 connects the housing 21 to compressor inlet which is at sub-atmospheric static pressure when operating. Vacuum pump $P_1$ may be provided to enhance the pressure reduction in casing 21 or the aspirator 36 may be operated from compressor discharge air to further reduce the pressure in the housing 21.

In order to start the turbine, the same relative settings are provided of the valves 28, 29 and 31 as when the gas turbine is idling. The resultant reduced pressure or fluid density in the housing 21 is continued until the turbine has accelerated to operating speed. This reduces or eliminates the drag of the aerodynamic pump element 23 on the gas turbine and thereby reduces the time to accelerate to full power speed.

After the operating speed is reached, the valves are manipulated so that valves 28, 29 are opened and valve 31 is closed. In this position, there is a flow of compressed fluid from the compressor 11 through line 26 to the converter casing 21 and from the converter casing 21 through line 27 to the combustor 15. At this time, the compressible fluid within the casing 21 is compressed to approximately the gas turbine compressor discharge pressure and absorbs work from the input rotor 23 and transmits power to the output rotor 25' in the form of increased head where it is extracted by the output rotor and delivered to the load as shaft work.

In order to insure that the pressure in the casing 21 lags behind compressor discharge and thereby providing minimum drag during acceleration, it is essential that the valves 28, 29 provide some pressure reduction. A similar result can be achieved by utilizing fixed orifices in lines 26, 27. Where orifices are used, it may be necessary to also have valves comparable to valves 28, 29 during the startup in order to facilitate the startup of the turbine.

In order to achieve a braking or speed reduction of the gas turbine when it is operating, an increased pressure of compressible fluid in the housing 21 is produced until the output shaft 24 decelerates to the desired speed. This increased density is achieved by reducing the flow through line 27 to the combustor 15. This can be accomplished by partially closing the valve 29 or utilizing the temperature controller 35. Alternatively, pressure booster pump $P_2$ can be operated to increase the density of the fluid in the casing 21. The increased density of fluid and reduced speed of the input rotor act to retard the output shaft 25.

In order to achieve maximum capacity, the stall torque ratio, namely, the ratio of output shaft torque at stall to output shaft torque at maximum speed may be optimized by varying the charging temperature and pressure of the aerodynamic torque converter in relation to the speed ratio, that is, the ratio of output speed to input speed. The temperature controllers 34, 35 and pressure controller 33 are used to produce this optimum operation in accordance with their optimum relationship to speed ratio.

The temperature controller 35 may also be used to limit the maximum allowable temperature of the working fluid in the housing 21.

Temperature controllers 34, 35 operate to restrict the return flow of fluid from the casing 21 of the areodynamic torque converter to the turbine 12. Specifically the temperature controller 34 varies the set point of temperature controller 35 to maintain the inlet temperature to the turbine constant. If the temperature at the turbine inlet increases, the temperature controller 34 operates to reduce the set point of temperature controller 35 and open valve 35' more to reduce the load on the shaft. The temperature controller 34 similarly controls the pressure controller 33 to operate valve 33' to vary the pressure of fluid in the casing 21. Thus if the inlet temperature of the turbine changes, pressure controller 33 is also varied to control the casing pressure.

The temperature and pressure in the casing can thereby be controlled in operation to produce the optimum desired gas turbine inlet temperature.

At any particular power level, the optimum gas turbine efficiency occurs at the maximum turbine inlet temperature allowable. The present invention permits the control without utilization of variable vanes, multiple rotors or other techniques.

In summary, this is basically achieved by adjusting the gas turbine speed to the lowest value which will supply the required power without exceeding the maximum allowable turbine inlet temperature. As explained above, this can be achieved in the present apparatus by changing the charging pressure and/or charging temperature of the aerodynamic torque converter to give the maximum turbine inlet temperature by regulating the shaft power absorbed from the turbine of the gas turbine.

In the present invention, the internal losses of the aerodynamic torque converter are regained regeneratively to the turbine power plant by returning pressurizing air to the turbine at a higher temperature than received from the compressor. At the same time this steady flow of fluid through the aerodynamic torque converter provides internal cooling to limit the temperature to a value compatible with the materials used in its construction.

Some of the advantages of the present invention may be summarized as follows:

(1) Speed reduction without gears or hydraulic converter.
(2) Recovery of transmission losses.
(3) Superior starting and acceleration of the gas turbine without the use of variable pitch vanes in either the gas turbine or the torque converter.
(4) A single shaft gas turbine which achieves the performance of a free power turbine.
(5) Substantially constant turbine inlet temperatures under all operating loads.
(6) Maximum capacity by varying the charging temperature and pressure of the aerodynamic torque converter in relation to the speed ratio.

Instead of connecting line 27 to the inlet of the combustor 15, the line may be connected to the outlet of the combustor 15 so that additional pressure drop is achieved which permits circulation in the torque converter without the need for pump $P_2$.

In addition, by diverting the flow through line 27, in whole or in part, the aerodynamic torque converter can be used as a source of pneumatic power that is at a higher pressure than the gas turbine.

I claim:
1. The combination comprising
    a compressor,
    a gas turbine having a combustor, a rotor and a stator, and a torque converter,
    said torque converter having a casing filled with a compressible fluid, a stator, an input rotor, and an output rotor which is driven by fluid action upon rotation of said input rotor,
    said input rotor of said torque converter being connected to and driven by said rotor of said turbine,
    a first fluid line between the outlet of said compressor and the interior of said casing of said torque converter, a second fluid line between the inlet to said gas turbine and said casing.

2. The combination set forth in claim 1 wherein said first fluid line communicates with said casing adjacent the inlet of said input rotor of said torque converter.

3. The combination set forth in claim 1 wherein said second fluid line communicates with said casing adjacent the outlet of said stator of said torque converter.

4. The combination set forth in claim 1 including a control valve in each of said fluid lines.

5. The combination set forth in claim 4 including a pressure regulator responsive to pressure in said casing for controlling the valve in said first fluid line.

6. The combination set forth in claim 5 including a temperature regulator responsive to temperature in said casing for controlling the valve in said second fluid line.

7. The combination set forth in claim 1 including a fluid regulator in said first fluid line and temperature responsive means responsive to the temperature of flow into said turbine for controlling said pressure regulator.

8. The combination set forth in claim 1 including a third fluid line extending between the inlet to said compressor and said casing.

9. The combination set forth in claim 8 including a valve in said third fluid line.

10. The combination set forth in claim 1 including an ejector associated with said first fluid line.

11. The combination set forth in claim 1 including a heat exchanger between the air flowing from said compressor to said turbine and the exhaust from said turbine.

12. The combination set forth in claim 1 including a pump in said first fluid line.

13. The combination comprising
a compressor having a stator and a rotor,
a turbine having a combustor, a rotor and a stator,
a shaft,
said rotors of said compressor and turbine being fixed on said shaft,
and a torque converter,
said torque converter having a casing filled with a compressible fluid, a stator, an input rotor, and an output rotor which is driven by fluid action upon rotation of said input rotor,
said input rotor of said torque converter being fixed on said shaft driven by said rotor of said turbine,
a first fluid line between the outlet of said compressor and the interior of said casing,
a second fluid line between the inlet to said gas turbine and said casing.

14. The combination set forth in claim 13 wherein said first fluid line communicates with said casing adjacent the inlet to said input rotor of said torque converter.

15. The combination set forth in claim 13 wherein said second fluid line communicates with said casing adjacent the outlet of said stator of said torque converter.

16. The combination set forth in claim 13 including a control valve in each of said fluid lines, and control means responsive to the temperature in said casing and the temperature of inlet to said turbine for controlling said valves.

17. The combination comprising
a compressor,
a gas turbine having a combustor, a rotor and a stator,
and a torque converter,
said torque converter having a casing filled with a compressible fluid, a stator, an input rotor, and an output rotor which is driven by fluid action upon rotation of said input rotor,
said input rotor of said torque converter being connected to and driven by said rotor of said turbine,
a first fluid line between the outlet of said compressor and a pressure area of said casing of said torque converter,
a second fluid line between the inlet to said gas turbine and a higher pressure area of said casing.

No references cited.

JULIUS E. WEST, *Primary Examiner.*